United States Patent [19]

Dommel

[11] Patent Number: 4,859,110

[45] Date of Patent: Aug. 22, 1989

[54] AUTOMATIC COUPLING DEVICE

[75] Inventor: Philip J. Dommel, Doylestown, Pa.

[73] Assignee: Neapco, Inc., Pottstown, Pa.

[21] Appl. No.: 247,167

[22] Filed: Sep. 21, 1988

[51] Int. Cl.⁴ .......................... F16B 21/00; F16D 1/00
[52] U.S. Cl. .................................... 403/325; 403/328; 403/359
[58] Field of Search ............... 403/322, 325, 327, 328, 403/359; 285/314

[56] References Cited

U.S. PATENT DOCUMENTS

| 3,357,206 | 12/1967 | Christie | 464/112 |
| 3,480,310 | 11/1969 | McElwain | 285/314 X |
| 3,551,013 | 12/1970 | Trojanowski et al. | 403/317 |
| 4,289,414 | 9/1981 | Recker | 403/12 |
| 4,402,626 | 9/1983 | Recker | 403/328 |
| 4,616,952 | 10/1986 | Schott | 403/325 X |
| 4,639,163 | 1/1987 | Buthe et al. | 403/322 |
| 4,775,269 | 10/1988 | Brix | 403/322 |

Primary Examiner—Randolph A. Reese
Assistant Examiner—Arlen L. Olsen
Attorney, Agent, or Firm—Woodcock, Washburn, Kurtz, Mackiewicz & Norris

[57] ABSTRACT

A coupling device suitable for connecting an externally splined power take-off stub shaft to a corresponding internally splined yoke with a universal joint. The coupling mechanism includes an automatic release to the locked position and locks axially onto the shaft by way of locking balls. A collar with flexible tabs is manually rotatable to the unlocked position and is triggered to rotate to the locked position by the locking balls. When the externally splined shaft is inserted into the internally splined yoke, the end of the shaft trips the balls causing the flexible tabs in the collar to move radially outward, releasing the collar which rotates to the locked position. The collar rotates camming the balls on a formed metal ring inside the plastic collar to the locked position. Rotation is produced by a fully enclosed torsional spring connected to the collar and the yoke and prevents over-rotation in either direction. When the coupling device is in the locked position the flexible tabs rest in recesses on the sides of the yoke in the relaxed mode.

12 Claims, 3 Drawing Sheets

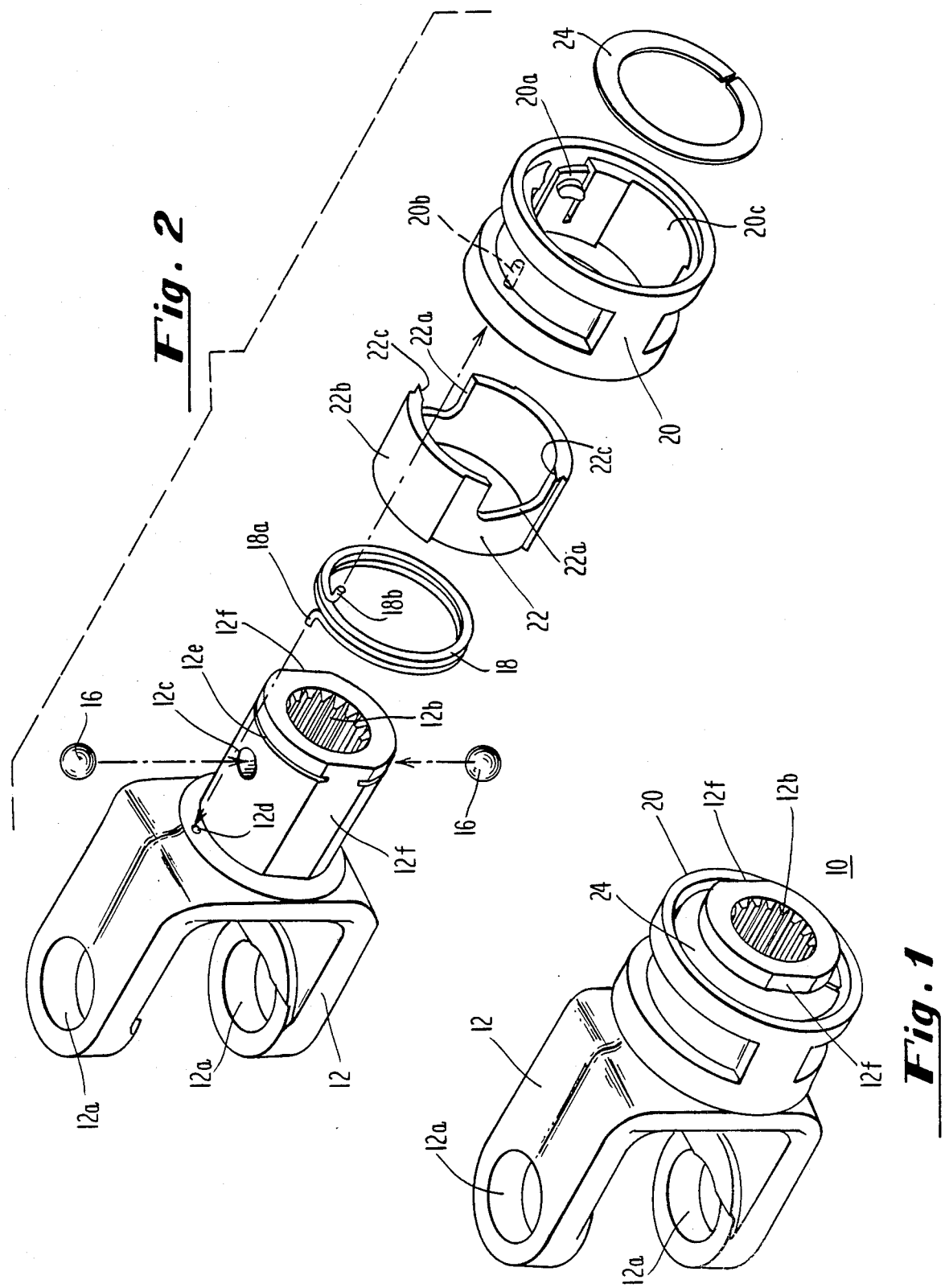

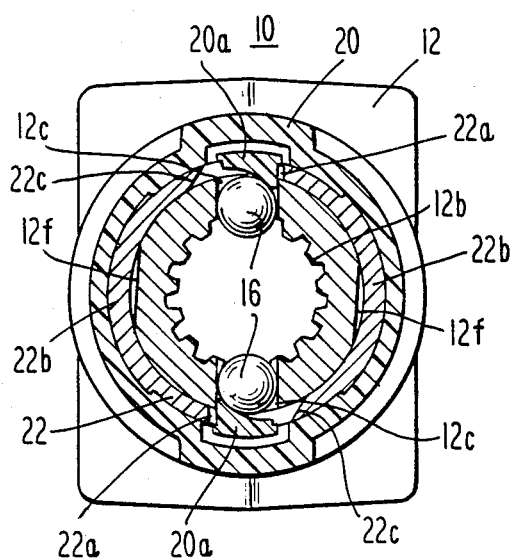 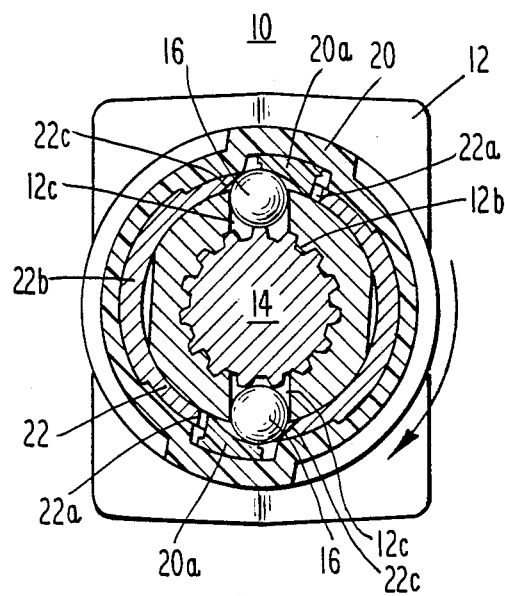
Fig. 4a   Fig. 4b
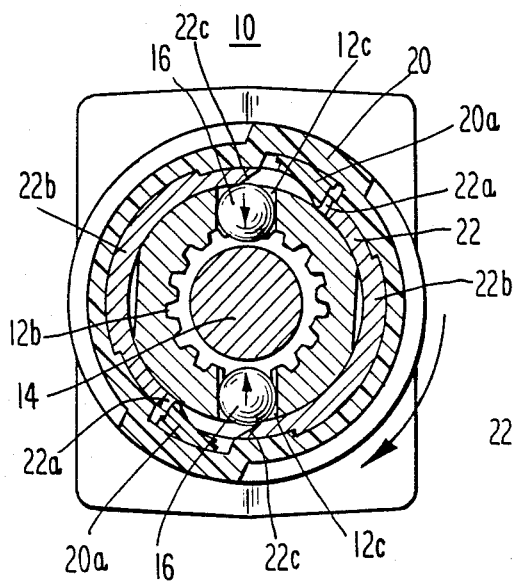 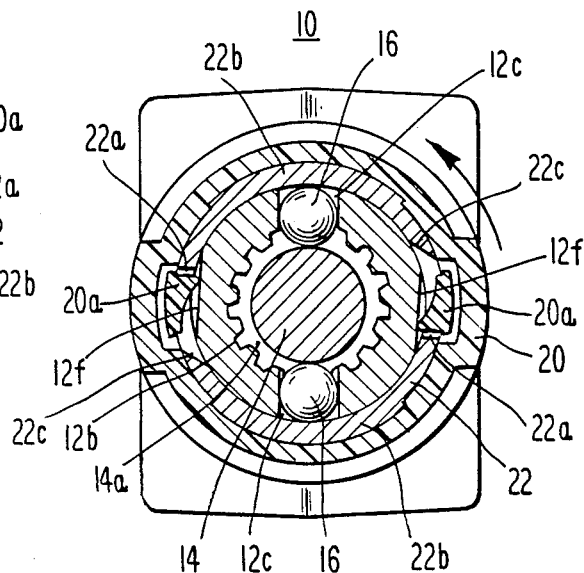
Fig. 4c   Fig. 4d

AUTOMATIC COUPLING DEVICE

BACKGROUND OF THE INVENTION

The present invention relates to an automatic coupling device suitable for connecting an externally splined power take-off shaft to a corresponding internally splined yoke with a universal joint and particularly to a coupling mechanism which incorporates an automatic release to the locked position and locks axially onto the shaft by way of locking balls.

The problem of coupling one shaft to another for transmitting a torque force is a problem that has long existed in the agricultural industry. Agricultural tractors are normally equipped with a splined power take-off shaft to which the shaft of a towed or mounted agricultural implement is connected by means of a coupling mechanism which conventionally includes an internally splined member mating with the splined power take-off shaft and having a universal joint. Such mechanisms also generally include a releasable lock for preventing the inadvertent axial separation of the mating splined members. Examples of such torque transmitting couplings are disclosed in U.S. Pat. Nos. 3,357,206 - Christie, 3,551,013 - Trojanowski et al, 4,289,414 - Recker and 4,402,626 - Recker. While the foregoing coupling mechanisms have been satisfactory in their operation, they have left something to be desired.

The present coupling device provides a simplified operation for use where once the mechanism is unlocked, the mechanism functions with a "no-hands" locking feature. Additionally, the present coupling device utilizes a collar design which totally encloses the torsional spring, locking elements and locking mechanism thus resisting entry of any foreign matter into the mechanism.

SUMMARY OF THE INVENTION

The present invention relates to a coupling device suitable for connecting an externally splined shaft having a circumferential groove therein to an internally splined member. The coupling device comprises an internally splined member having a plurality of radial openings in the sides thereof and a plurality of balls carried by the respective openings in the internally splined member for protrusion between the splines into the groove in the internally splined shaft. The coupling device also includes a collar having a plurality of axially extending flexible tabs positioned on the sides of the collar and cam means fixed within the collar and having a plurality of openings in the sides thereof into which the flexible tabs are adapted to extend. The cam means and the collar are disposed on the outer surface of the internally splined member for rotation relative thereto. A torsional spring is positioned within the collar and the spring has one end thereof connected to the collar and the other end connected to the internally splined member for rotation of the collar relative to the internally splined member against the force of the spring. There is further provided means for preventing axial movement of the collar relative to the internally splined member while permitting rotation movement of the collar between an unlocked position and a locked position. When the collar is rotated to the unlocked position, the tabs of the collar are moved into engagement with the openings in the internally splined member and the balls therein against the force of the torsional spring to permit outward radial movement of the balls relative to the shaft thereby permitting axial movement between the shaft and the internally splined member. The radial movement of the balls causes the tabs to move radially out of the openings in the internally splined member thereby releasing the force of the torsional spring causing the collar automatically to rotate toward the locked position moving the openings in the cam means out of alignment with the openings in the internally splined member and moving the cam into engagement with the balls. This causes the balls to move radially inward into the circumferential groove in the shaft upon arrival of the collar at the locked position thereby preventing axial movement between the shaft and the internally splined member.

It is an object of the invention to provide a coupling device having a mechanism incorporating an automatic release to the locked position which locks the mechanism axially onto the shaft by way of locking balls.

It is a another object of the invention to provide an automatic coupling mechanism having a collar rotatable to the unlocked position and which is triggered to the locked position by the locking balls.

A further object of the invention is to provide a coupling device for connecting a drive member with a driven member and having one set of balls that both trigger the mechanism and lock the driven member onto the drive member.

Other objects and advantages of the invention will become apparent from the following detailed description of the invention taken in conjunction with the accompanying drawings.

BRIEF DESCRIPTION OF THE DRAWINGS:

FIG. 1 is a perspective view of a coupling device embodying the present invention.

FIG. 2 is an exploded perspective view of the coupling device illustrated in FIG. 1.

FIG. 4a is a sectional view taken along the lines 4a—4a in FIG. 3a showing the coupling device in unlocked position.

FIG. 4b is a sectional view along the lines 4b—4b in FIG. 3b showing the coupling device with the drive shaft partially inserted.

FIG. 4c is a sectional view of the coupling device similar to FIG. 4b with the drive shaft further inserted into the coupling device.

FIG. 4d is a sectional view taken along the lines 4d—4d in FIG. 3 showing the coupling device in locked position with the drive shaft fully inserted.

PREFERRED EMBODIMENT OF THE INVENTION

Figure 3A:
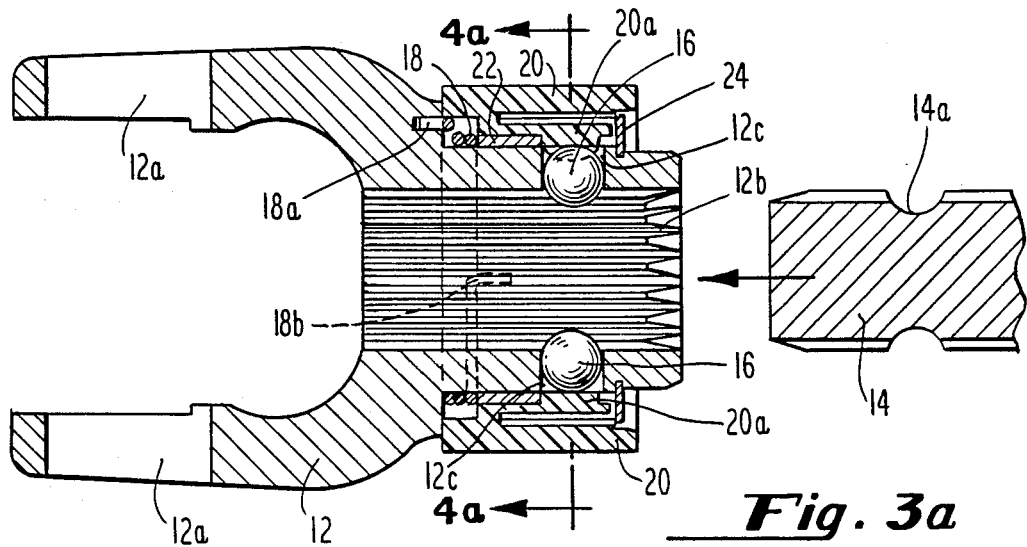
FIG. 3a is a vertical sectional view of the coupling device illustrated in FIG. 1 in unlocked position with a drive shaft prepared to be inserted therein.
Figure 3B:
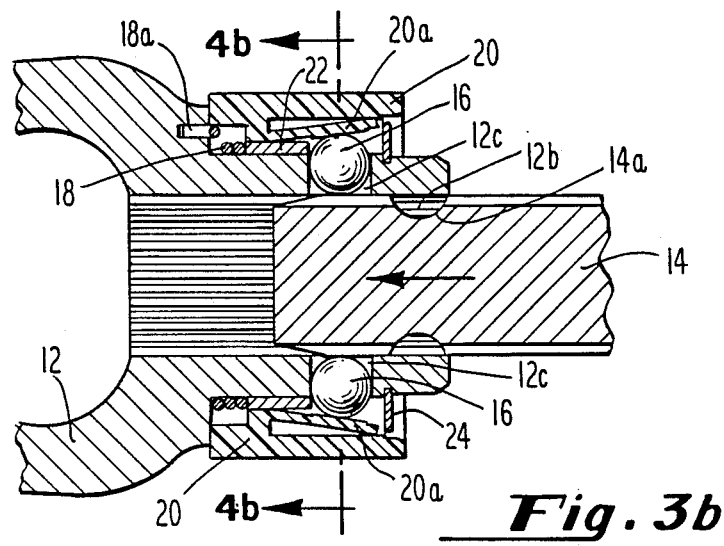
FIG. 3b is a sectional view similar to FIG. 3a with the drive shaft partially inserted into the coupling device.
Figure 3C:
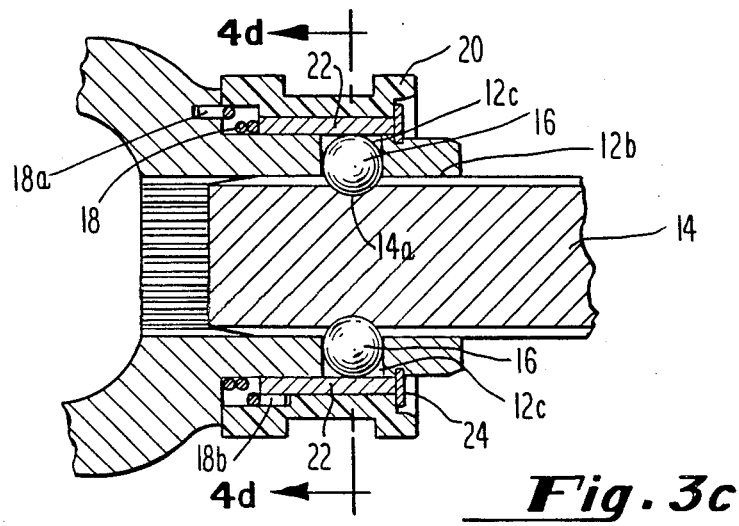
FIG. 3c is a sectional view similar to FIGS. 3a and 3b with the drive shaft fully inserted into locked position in the coupling device.

Referring to FIG. 1, the coupling device 10 of the present invention has been shown in connection with a driven member in the form of an internally splined yoke 12 having spaced ears with openings 12a, 12a therein adapted for attachment to a universal joint. The splined opening 12b in the yoke 12 is adapted to receive an externally splined drive member such for example as a power take-off stub shaft 14 as shown in FIGS. 3a–3c. As may be seen the shaft 14 has a circumferential groove 14a near the end thereof to receive a plurality of locking elements or balls as hereinafter described.

The various parts of the coupling device 10 are best shown in FIG. 2. The internally splined portion 12b of the yoke 12 is provided with a pair of radial openings 12c, 12c on the opposite sides thereof which are adapted to receive a pair of locking elements, or balls, 16, 16 for protrusion between the splines of the internally splined portion 12b on member 12. A torsional spring 18 slips over the internally splined portion 12b of the yoke 12 and one end 18a of the spring 18 fits into an opening 12d in the yoke 12. The coupling device 10 includes a rotatable collar 20 having a pair of axially extending flexible fingers or tabs 20a, 20a positioned on the opposite sides of the collar. The collar 20 and the integral tabs 20a are preferably made from a suitable tough plastic such, for example, as Zytel TM nylon. A metal ring 22 is fixed within the collar 20 and has a pair of openings 22a, 22a on the opposite sides thereof into which the free end of the flexible tabs 20a, 20a of the collar 20 are adapted to extend. Thus it will be seen that the ring 22 acts as a metal liner for the outer collar 20. The collar 20 with the metal liner 22 inserted therein slides onto the splined extension 12b of the yoke 12 and the opposite end 18b of the torsional spring 18 extends into the opening 20b in the collar 20. In order to lock the metal ring 22 within the collar 20, the ring 22 is provided with a pair of raised portions 22b which are adapted to be received in corresponding recesses 20c in the collar 20. Other suitable arrangements may be used for locking the ring 22 within the plastic collar 20 such, for example, as serrations on the metal ring. After the collar 20 has been assembled on the internally splined end 12b of the yoke 12, the various parts including the spring 18, the ring 22 and the collar 20 are held in place by a snap ring 24 which fits within a snap ring recess at the outer end of the collar 20 and in a circumferential groove 12e on the exterior of splined portion 12b of the yoke. The yoke 12 is also provided with a pair of longitudinally extending flat surfaces 12f, 12f on the opposite sides of the yoke, the purpose of which will be hereinafter described.

The operation of the coupling device 10 will now be described. As shown in FIG. 3a and FIG. 4a the coupling device 10 is shown in the unlocked position preparatory to insertion of the drive shaft 14 into the internally splined portion 12b of the yoke 12. The flexible tabs 20a, 20a of the collar 20 extend into the openings 22a, 22a in the metal ring or liner and also into the openings 12c, 12c in the internally splined member 12 which receive the locking balls 16, 16. It will be noted in FIG. 4a that the free ends of the flexible tabs 20a, 20a are provided with a shoulder which engages the side edge of the openings 12c, 12c in the internally splined portion 12b and a curved surface which engages the surface of the locking balls 16, 16. The flexible tabs 20a, 20a hold the collar 20 in this unlocked position against the force of the torsional spring 18 preparatory to insertion of the splined shaft 14 into the internally splined portion 12b of the yoke 12.

Referring now to FIG. 3b and FIG. 4b it will be seen that the splined shaft 14 has been partially inserted into the internally splined portion 12b and the end of the splined shaft 14 has engaged and tripped the locking balls 16, 16 to move them outwardly in a radial direction against the ends of the pair of flexible tabs 20a, 20a. As shown in FIG. 4b, the shoulders on the flexible tabs 20a, 20a have been moved out of engagement with the sides of the openings 12c, 12c in the internally splined member 12 which receive the locking balls 16, 16. This triggers the collar 20 which under the action of the torsional spring 18 has started to cause the collar 20 and its inner ring 22 to rotate in a clockwise direction for automatic movement toward the locking position. As shown in FIG. 4c the collar 20 has rotated through a further angle and the cam portions 22c, 22c of the ring 22 have engaged the locking balls 16, 16 to cause the locking balls to move in a radially inward direction as indicated by the arrows in FIG. 4c. Upon further rotational movement of the collar 22 in a clockwise direction under the force of the torsional spring 18 the collar 22 rotates to the position shown in FIG. 3c and FIG. 4d which is the locked position. At this time, the splined shaft 14 has been fully inserted into the internally splined portion 12b of the yoke 12, FIG. 3c. It will be noted that the locking balls, 16, 16 have been cammed downwardly by the cam surfaces 22c, 22c and engage the inside surfaces of portions 22b, 22b of the ring 22 so that the locking balls 16, 16 are now firmly positioned in the circumferential groove 14a near the end of the shaft 14.

At this time the force of the torsional spring 18 has been released and the collar 20 has been rotated through an angle of 90° in a clockwise direction. This is illustrated by comparing the unlocked position in FIG. 4a with the locked position in FIG. 4d. It will also be noted that the flexible tabs 20a, 20a now engage the pair of opposed flat surfaces 12f, 12f, on the opposite sides of the internally splined section 12b. At this time the splined shaft 14 is locked within the internally splined yoke 12 and axial movement between the two is prevented by reason of the locking balls 16, 16 which extend into the circumferential groove 14a, FIG. 3c.

From the foregoing description and the drawings it will be seen that when the splined shaft 14 is inserted into the internally splined yoke 12, the coupling device 10 moves automatically from the unlocked position of FIG. 4 to the locked position of FIG. 4d when the shaft is fully inserted. The coupling device 10 may be manually unlocked by grasping the collar 20 and rotating it in a counter clockwise direction as shown by the arrow in FIG. 4d until the collar assumes the position shown in FIG. 4a. At this time the shaft 14 may be withdrawn from the coupling device as the balls 16, 16 will move out of the groove 14a and in an outward radial direction against the flexible tabs 20a thus freeing the shaft 14 from the internally splined yoke 12. This action triggers the mechanism causing the torsional spring 18 to rotate the collar 20 again in a clockwise direction to adjust the coupling device 10 to the locked position shown in FIG. 4d. However, by this time the shaft 14 has been removed from the internally splined yoke 12 and is no longer locked therein. To reinsert the shaft 14 into the internally splined yoke 12, the collar 22 is again rotated manually in a counter clockwise direction from the position shown in FIG. 4d to the position shown in FIG. 4a so that the coupling device 10 will again be in the unlocked position. Upon reinsertion of the splined shaft 14 into the internally splined yoke 12, the foregoing operations will be repeated so that the coupling device 10 automatically locks the shaft 14 within the internally splined yoke 12.

When the collar 20 is rotated from the locked position of FIG. 4d to the unlocked position of FIG. 4a there is a click produced by the mechanism due to the tabs 20a, 20a moving into the openings 12c, 12c in the internally splined yoke 12. Similarly when the shaft 14 is inserted into the internally splined yoke 12, the collar 20 clicks when the flexible tabs 20a, 20a move out of the openings 12c, 12c in the internally splined yoke 12 followed by rotation of the collar 20 to the locked position in FIG. 4d.

The torsional spring 18 is designed to prevent over-rotation of the collar 20 in either direction. In the embodiment illustrated, the spring 18 has been designed for rotation through an angle of approximately 90°. It is to be understood that the spring could be designed for greater or lesser rotation if desired. When the collar is rotated in one direction, the spring 18 tightens on the outside surface of the internally splined portion 12b of the yoke 12 thus limiting further rotation of the collar 20 in that direction. When the collar 20 is rotated in the reverse direction, the coils of the spring 18 increase in diameter and tightly engage the inside surface of the collar 20. This limits the rotation of the collar 20 in the reverse direction. It will be noted that the torsional spring 18 is totally enclosed within the collar 20 as shown in FIGS. 3a–3c. The locking balls 16, 16 and the cam ring 22 are also totally enclosed within the collar 20. The snap ring 24 fits within the recess at the outer end of the collar 20 allowing assembly of the coupling device onto the end of the yoke 12 and keeps out foreign matter from the interior of the mechanism. The flat surfaces 12f, 12f on the yoke 12 help keep the flexible tabs 20a, 20a, in a relaxed state and the collar 20 in the locked position shown in FIG. 4d. The collar 20 has a pair of spaced finger-grips positioned between the pair of raised portions as shown in FIG. 4d. The locked position is indicated and can be felt and seen by the raised portion between the finger grips which should be pointed between the ears of the yoke 12 when the coupling device 10 is in the locked position.

While the invention has been specifically described in connection with a coupling device for connecting an externally splined shaft with an internally splined member, it is to be understood that the coupling device is also suitable for coupling other male and female members where it is desired to prevent axial movement therebetween but also to permit ready coupling and uncoupling of the male and female members. For example, in some coupling applications, a single locking ball may be used rather than a plurality of balls.

While a preferred embodiment of the invention has been described and illustrated, it is to be understood that further modifications thereof may be made within the scope of the appended claims without departing from the spirit of the invention.

What is claimed is:

1. A coupling device suitable for connecting an externally splined shaft having a circumferential groove therein to an internally splined member comprising:
    an internally splined member having a plurality of radial openings in the sides thereof,
    a plurality of balls carried by the respective openings in said internally splined member for protrusion between the splines into the groove in the externally splined shaft,
    a collar having a plurality of axially extending flexible tabs positioned on the sides of said collar;
    cam means fixed within said collar and having a plurality of openings in the sides thereof into which said flexible tabs are adapted to extend, said cam means and said collar being disposed on the outer surface of said internally splined member for rotation relative thereto;
    a torsional spring positioned within said collar,
    said spring having one end thereof connected to said collar and the other end connected to said internally splined member for rotation of said collar and said cam means relative to said internally splined member against the force of said spring; and
    means for preventing axial movement of said collar relative to said internally splined member while permitting rotational movement of said collar between an unlocked position and a locked position, whereby when said collar is rotated to the unlocked position said tabs of said collar are moved into engagement with the openings in said internally splined member and the balls therein against the force of said torsional spring to permit outward radial movement of said balls relative to the shaft thereby permitting axial movement between the shaft and the internally splined member, the radial movement of the balls causing said tabs to move out of the openings in said internally splined member thereby releasing the force of said torsional spring causing said collar automatically to rotate toward the locked position moving said openings in said cam means out of alignment with said openings in said internally splined member and moving said cam means into engagement with said balls thereby causing said balls to move radially inward into the circumferential grove in the shaft upon arrival of said collar at the locked position thereby preventing axial movement between the shaft and the internally splined member.

2. A coupling device according to claim 1 wherein said cam means comprises a metal ring in fixed position within said collar and having a plurality of openings in the sides thereof into which the flexible tabs are adapted to extend, the sides of the openings having cam surfaces for engaging the plurality of balls.

3. A coupling device according to claim 1 wherein said flexible tabs are integral with said collar and said flexible tabs have a free end which is shaped to be received in the radial openings in said internally splined member.

4. A coupling device according to claim 1 wherein said internally splined member has a pair of radial openings in the opposite sides thereof to receive a pair of said balls, said collar has a pair of axially extending flexible tabs positioned on opposite sides of said collar, said cam means comprises a ring in fixed position within said collar and having a pair of openings on the opposite sides thereof into which said flexible tabs are adapted to extend.

5. A coupling device for connecting a male member having a circumferential groove therein to a female member to prevent axial movement therebetween comprising:
    a female member having a plurality of radial openings in the sides thereof,
    a plurality of locking balls carried by the respective openings in said female member for protrusion into the groove in the male member,
    a collar having a plurality of flexible tabs positioned on the sides of said collar;
    cam means fixed within said collar and having a plurality of openings in the sides thereof into which said flexible tabs are adapted to extend, said cam means and said collar being disposed on the outer surface of said female member for rotation relative thereto;

a torsional spring positioned within said collar, said spring having one end thereof connected to said collar and the other end connected to said female member for rotation of said collar relative to said female member against the force for said spring; and means for preventing axial movement of said collar relative to said female member while permitting rotational movement of said collar between an unlocked position and a locked position, whereby when said collar is rotated to the unlocked position said tabs of said collar are moved into engagement with the openings in said female member and the balls therein against the force of said torsional spring to permit outward radial movement of said locking balls relative to the male member thereby permitting axial movement between the male and female members, the radial movement of the balls causing said tabs to move out of the openings in said female member thereby releasing the force of said torsional spring causing said collar automatically to rotate to the locked position covering said openings in said female member to prevent outward movement of said locking balls so that when the male member is inserted into said female member said locking balls move radially into the circumferential groove in the male member to prevent axial movement between the male and female members.

6. A coupling device according to claim 5 for transmitting torque wherein said female member has a non-circular opening adapted to receive a non-circular portion of the male member.

7. A coupling device according to claim 5 wherein said collar is a plastic member and said plurality of flexible tabs are integral with said collar.

8. A coupling device according to claim 7 including a metal ring in fixed position within said collar and having a plurality of openings in the side thereof into which the flexible tabs are adapted to extend, the sides of the openings having cam surfaces for engaging the plurality of balls.

9. A coupling device for connecting a male member having a locking groove therein to a female member to prevent axial movement therebetween comprising:

a female member having at least one radial opening in the side thereof, at least one locking element carried by the respective opening in said female member for protrusion into the locking groove in the male member, a collar having at least one flexible finger positioned on the side of said collar;

cam means fixed within said collar and having a plurality of openings in the sides thereof into which said flexible tabs are adapted to extend, said cam means and said collar being disposed on the outer surface of said female member for rotation relative thereto;

a torsional spring positioned within said collar, said spring having one end thereof connected to said collar and the other end connected to said female member for rotation of said collar relative to said female member against the force of said spring; and means for preventing axial movement of said collar relative to said female member while permitting rotational movement of said collar between an unlocked positioned and a locked position, whereby when said collar is rotated to the unlocked position said finger on said collar is moved into engagement with the radial opening in said female member and the locking element therein against the force of said torsional spring to permit outward radial movement of said locking element relative to the male member thereby permitting axial movement between the male and female members, the radial movement of the locking element causing said finger to move out of the radial opening in said female member thereby releasing the force of said torsional spring causing said collar automatically to rotate to the locked position covering said opening in said female member to prevent outward movement of said locking element so that when the male member is inserted into said female member said locking element moves radially into the locking groove in the male member to prevent axial movement between the male and female members.

10. A coupling device according to claim 9 wherein said collar is a plastic member and said flexible finger is integral with said collar.

11. A coupling device according to claim 10 including a metal ring in fixed position within said collar and having at least one opening in the side thereof into which the flexible finger is adapted to extend, a side of the opening having a cam surface for engaging the locking element.

12. A coupling device including a member having an internally splined opening being adapted to receive an externally splined shaft having a recess therein, locking structure selectively locking the shaft into the opening in the member, said locking structure being biased to a locked position and selectively movable to an unlocked position, said locking structure including means for automatically locking the shaft within the member upon insertion of the shaft into the internally splined opening of the member and structure for allowing unlocking of the shaft from the internally splined member, said locking structure including at least one bore radially disposed in said member, a locking element slidably disposed in said bore and being radially movable from an inner locking position, wherein the element is engageable within the recess in the shaft to prevent relative axial movement of the member with respect to the shaft, and an outer unlocked position, whereby the element permits relative axial movement of the member and the shaft, and rotatable means for maintaining the locking element in the unlocked position with respect to the recess in the shaft while the shaft is being withdrawn or inserted into the opening in the member, said means for maintaining said locking element in the unlocked position being automatically actuated and rotated to the locked position, upon insertion or withdrawal of the shaft from said opening in said internally splined member said locking structure further comprises cam means positioned on the outside of said internally splined member and fixed within a collar having a plurality of openings in the sides thereof into which flexible tabs are adapted to extend.

said cam means and said collar being disposed on the outer surface of said internally splined member for rotation relative thereto.

* * * * *